Feb. 12, 1946.   F. T. SONNE ET AL   2,394,817
PHOTOGRAPHIC PRINTER
Filed July 19, 1943   8 Sheets-Sheet 1
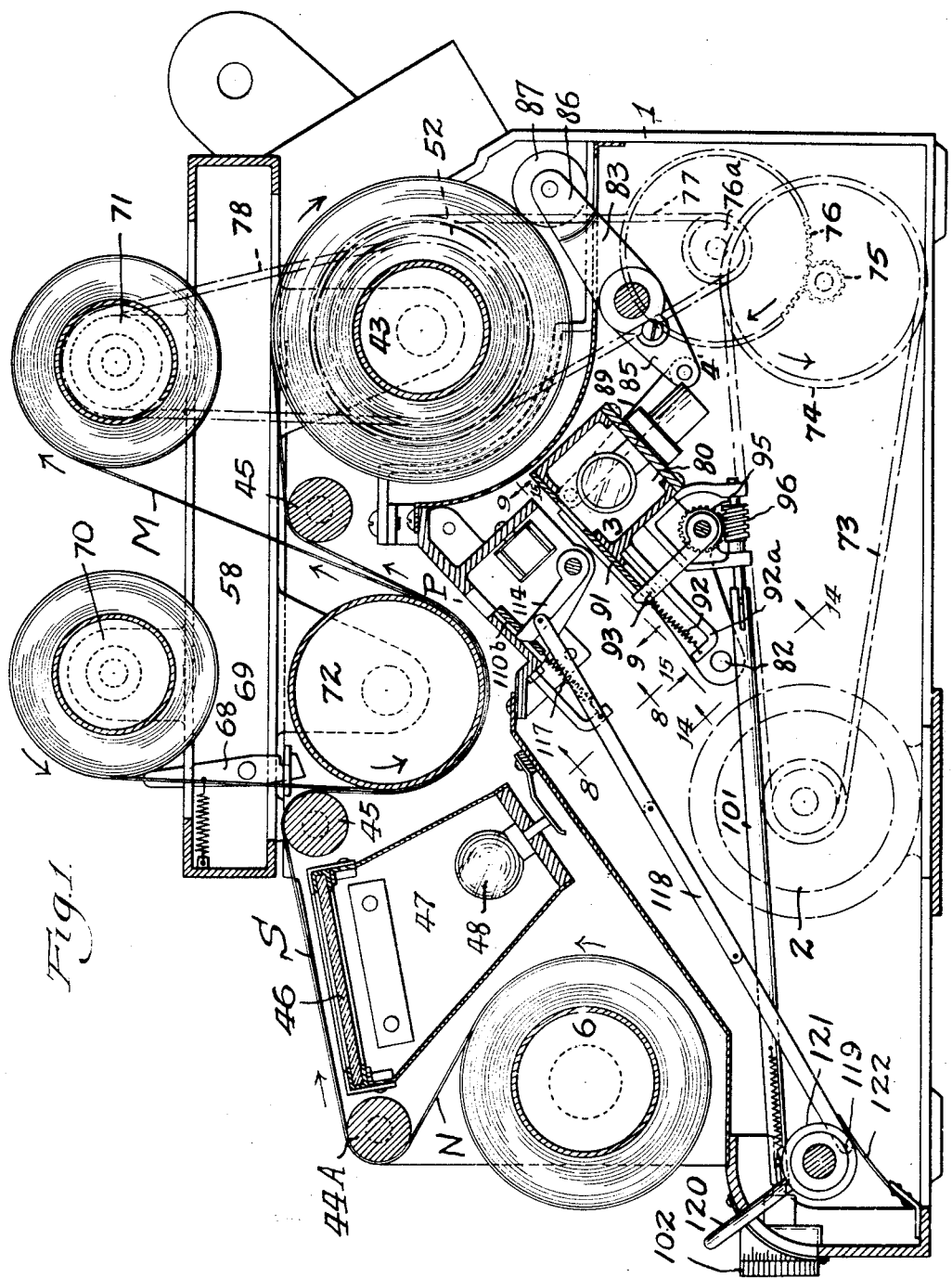
Inventors
Frederick T. Sonne &
By: Victor Sussin.
James A. S. Koehe.
Attorney.

Feb. 12, 1946. F. T. SONNE ET AL 2,394,817
PHOTOGRAPHIC PRINTER
Filed July 19, 1943 8 Sheets-Sheet 2
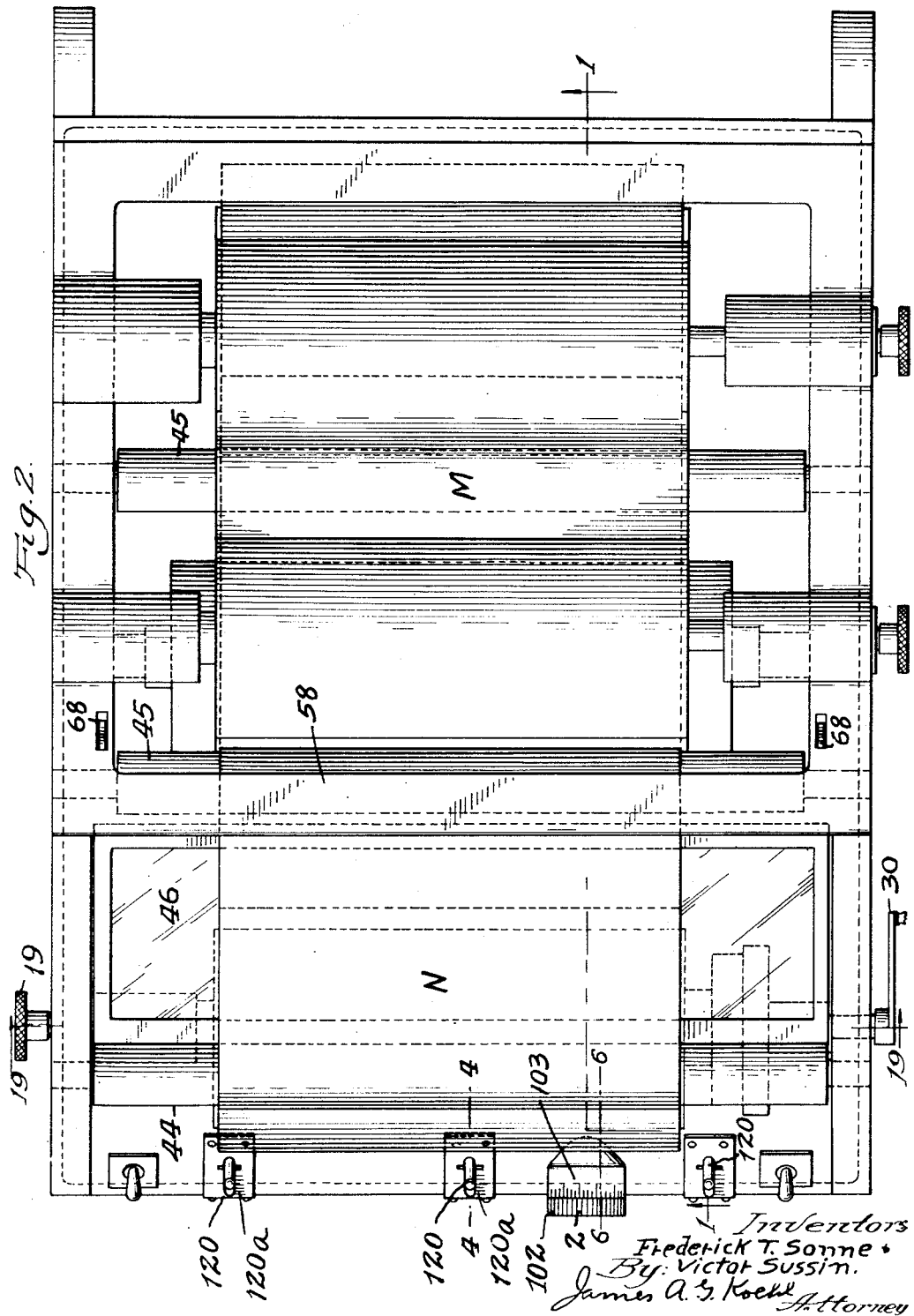

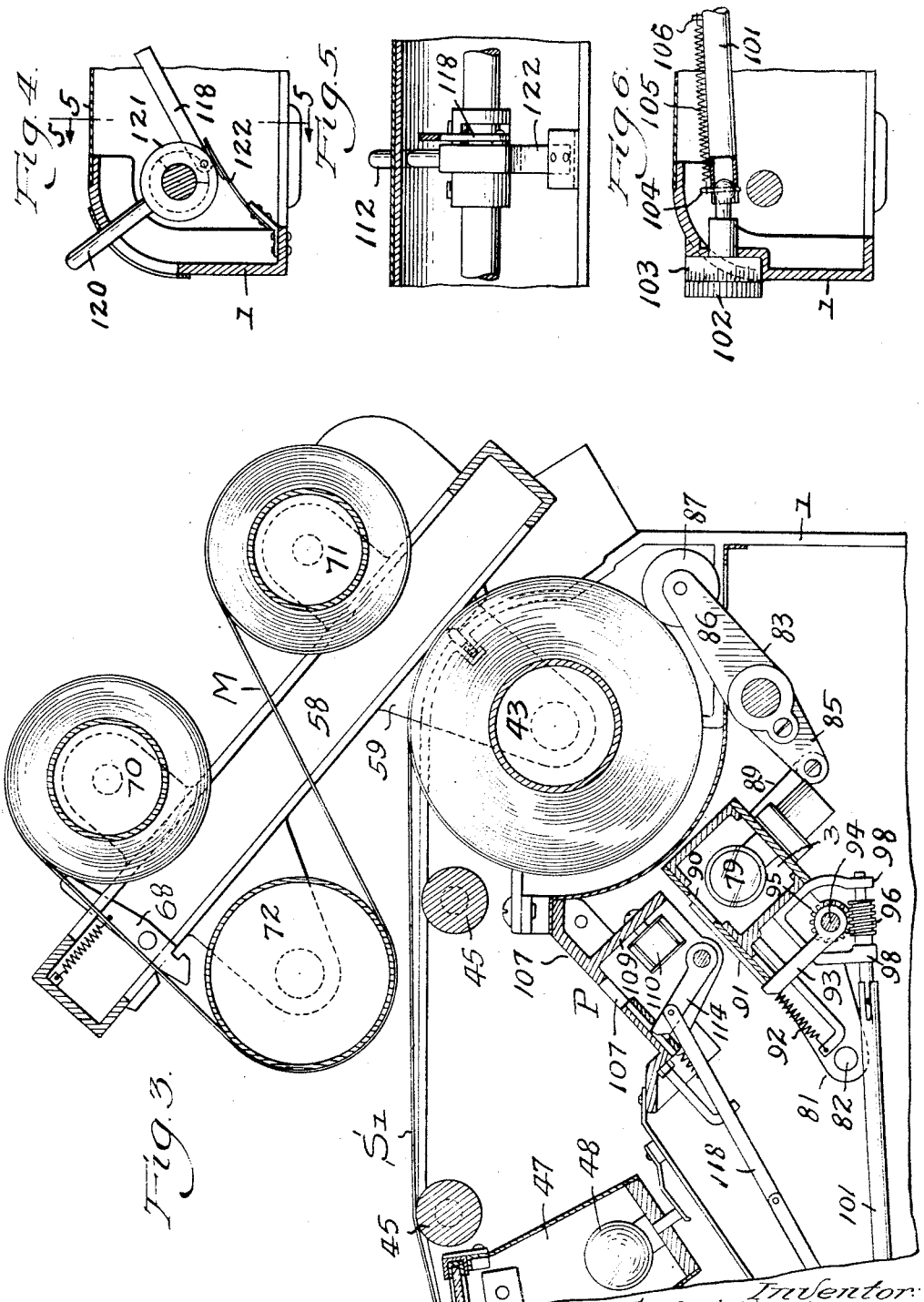

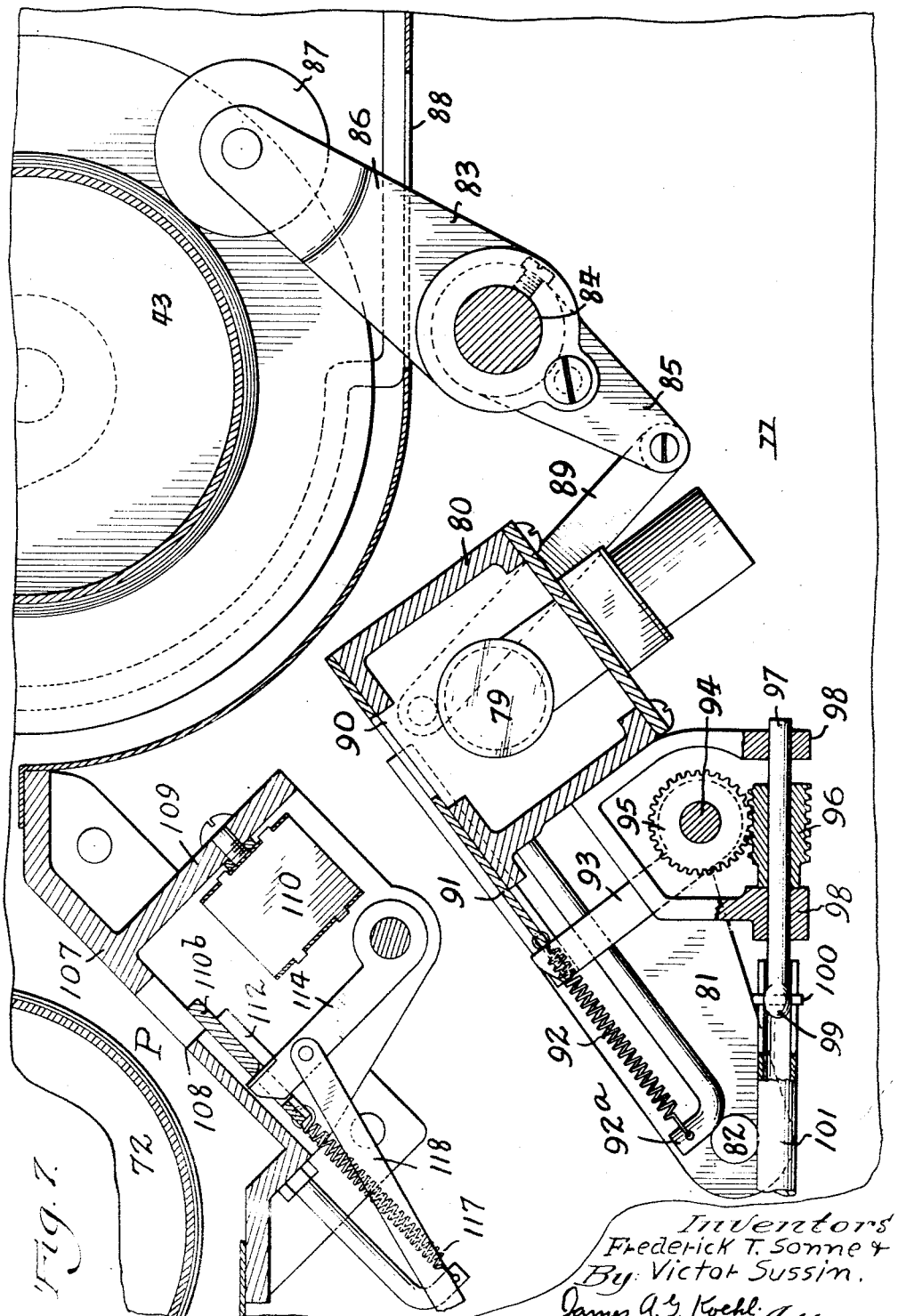

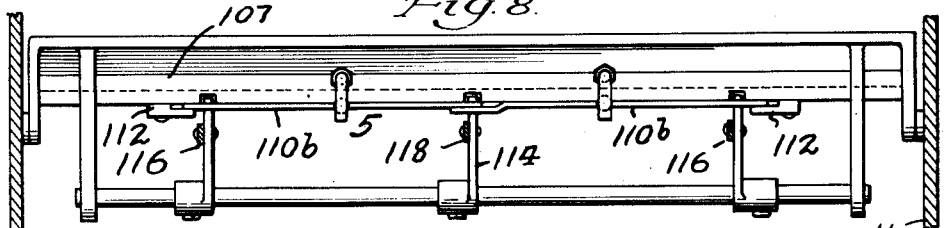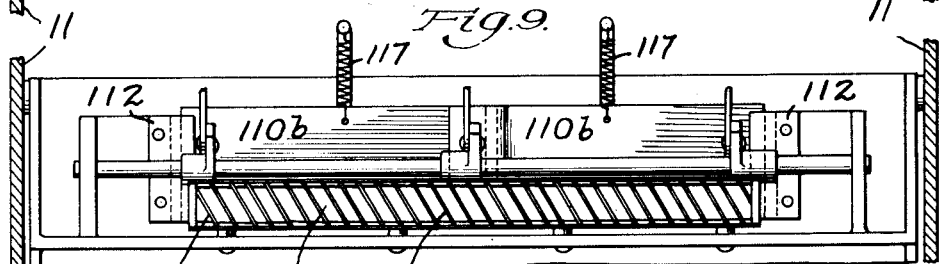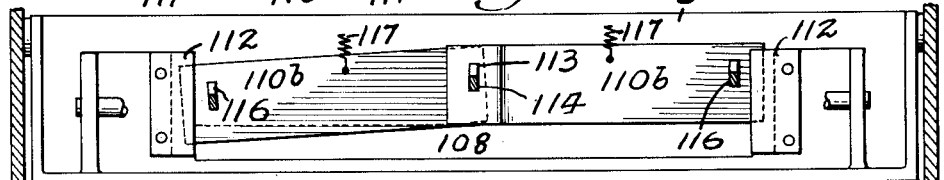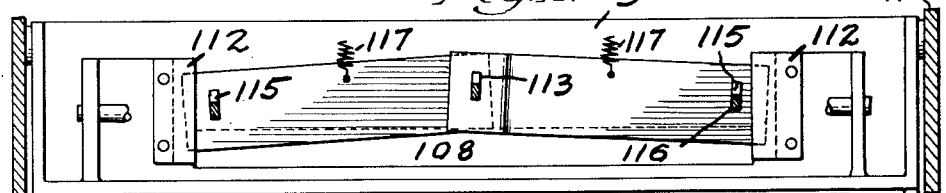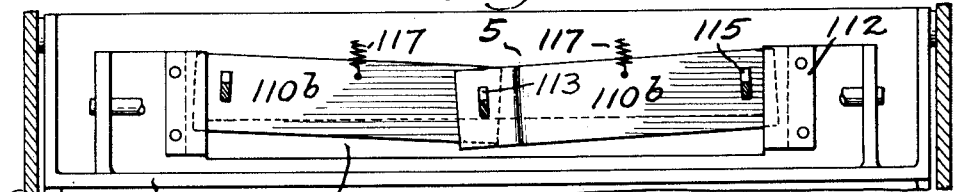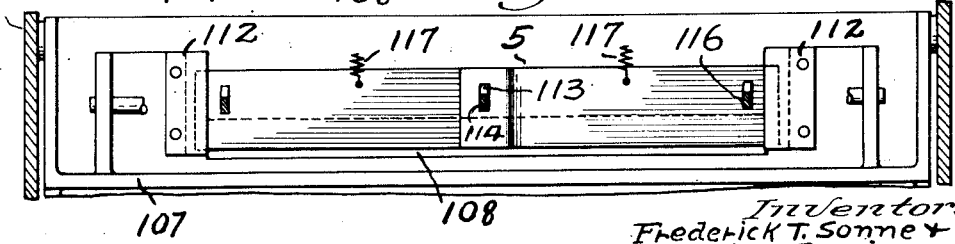

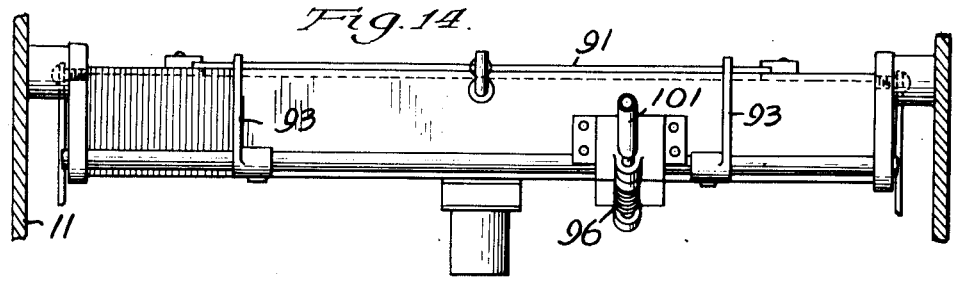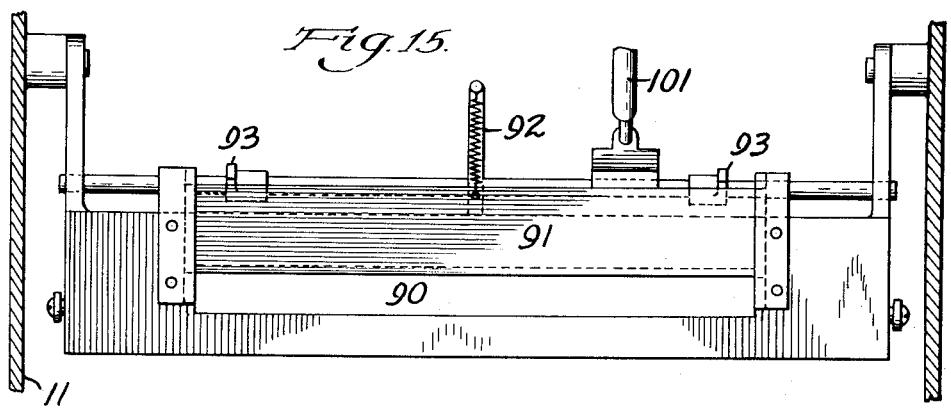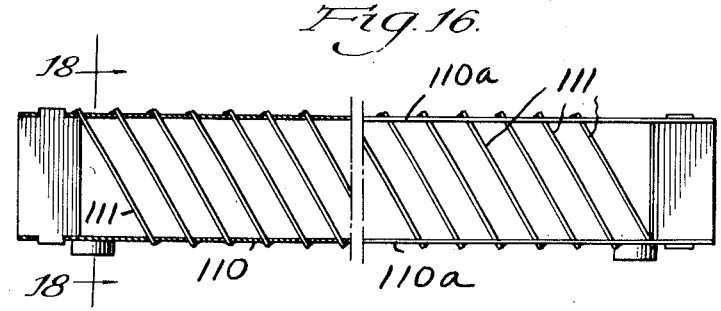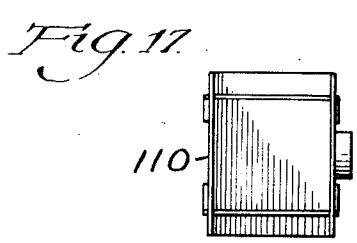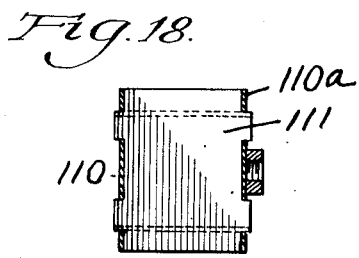

Feb. 12, 1946. F. T. SONNE ET AL 2,394,817
PHOTOGRAPHIC PRINTER
Filed July 19, 1943 8 Sheets-Sheet 7
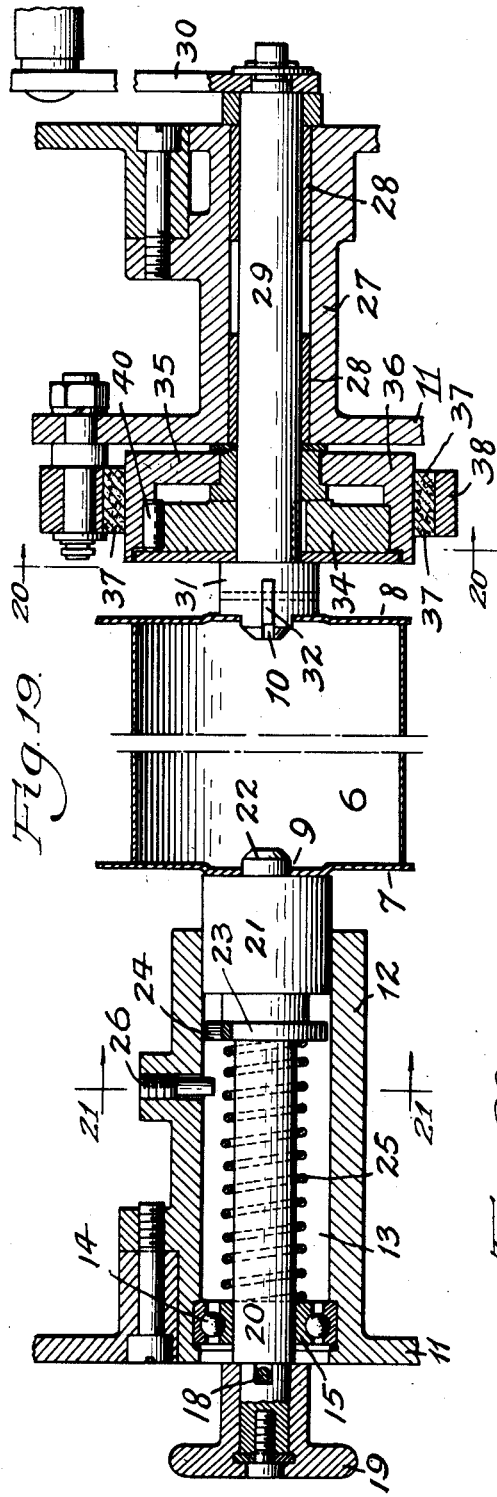
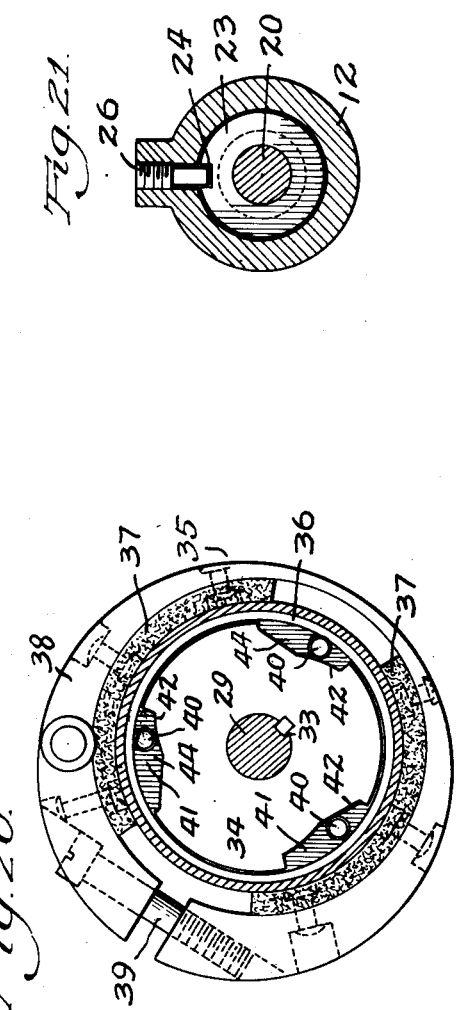
Inventors:
Frederick T. Sonne +
Victor Sussin
By: James A. G. Koehl
Attorney Feb. 12, 1946. F. T. SONNE ET AL 2,394,817
PHOTOGRAPHIC PRINTER
Filed July 19, 1943
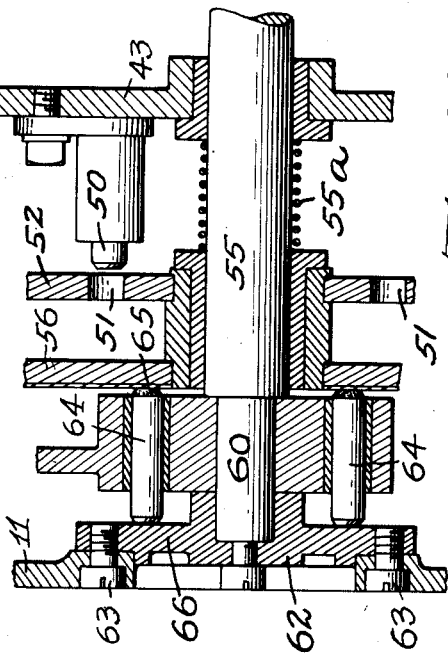
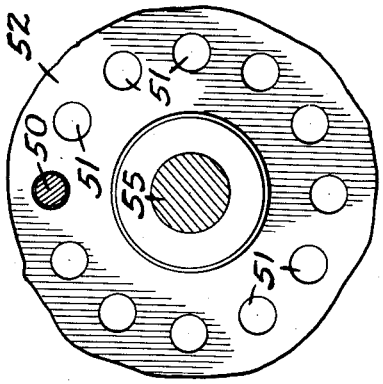
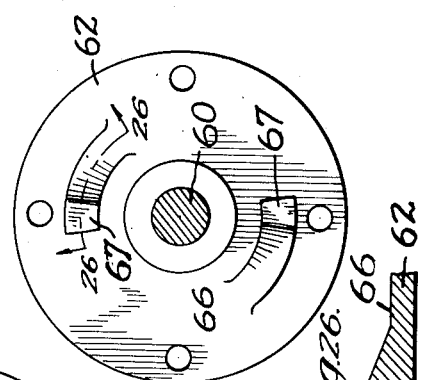
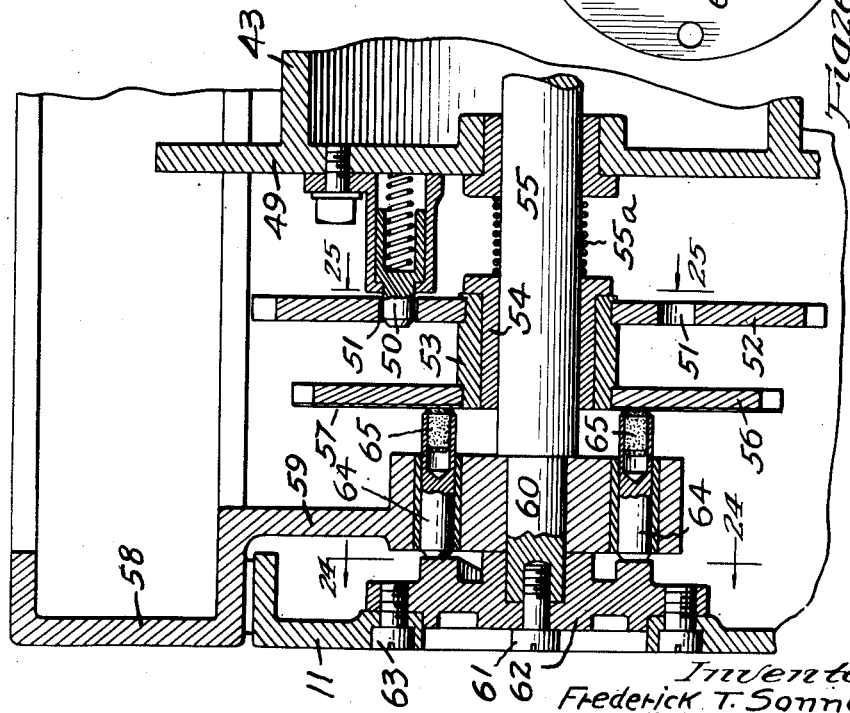

Patented Feb. 12, 1946

2,394,817

UNITED STATES PATENT OFFICE 2,394,817

PHOTOGRAPHIC PRINTER

Frederick Theodore Sonne, Golf, and Victor Sussin, Chicago, Ill., assignors to Chicago Aerial Survey Company, Chicago, Ill., a corporation of Illinois Application July 19, 1943, Serial No. 495,240

12 Claims. (Cl. 95—75)

This invention relates to continuous photographic printing apparatus for making photographic prints from continuous strip or other negatives.

Among the more essential objects of the invention, the following ones are illustrative:

(1) The provision of automatic means by which the exposure time is held constant during continuous translation of the negative and the sensitized printing material.

(2) The provision of an organization including reeling and unreeling mechanism and a coacting light source by which the exposure time is always accurately proportional to the angular velocity of an idler roll, the velocity of which varies as the diameter of the pay-on roll of the reeling and unreeling mechanism increases during the process of making a print.

(3) The provision of means for controlling the size of the light aperture at any instant during the printing operation.

(4) The provision of means for illuminating a stretch of the continuous negative to constantly render visually discernible the density of different portions of the negative.

(5) The provision of means for insuring that the light shall always be proportional to the density of any part of the negative, regardless of the geometrical configuration and proportions of said part, the said means being supplemental to the aforementioned light controlling means at the point source of light and having coaction therewith so that and by virtue of both said means, most any desired proportion of light can be instantly used at the effective point of exposure of the apparatus.

(6) The provision of an organization enabling the successive making of prints from the same negative without necessitating removal of the negative at the end of each individual printing operation.

(7) The provision of means for facilitating the insertion of magazine rolls in and removal thereof from the apparatus.

(8) The provision of means for insuring intimacy of surface contact between the negative and the printing material and for feeding the negative and said printing material in absolute synchronism and with avoidance of any slippage thereof during the printing operation.

(9) The provision of means for simplifying threading the strip negative and the printing material through the apparatus initially and for associating the front end of each thereof with its respective pay-on-roll.

(10) The provision of means for intercepting the light between the point source of light and the film and limiting the angularity of the rays emanating from said light source.

(11) The provision of an improved organization of dependably functioning instrumentalities, the whole providing a simple and readily portable, strong and durable device which may be operated with greater facility than has been possible heretofore and is productive of new and improved results never before attained.

Other objects and advantages of the invention will become manifest upon reference to the accompanying drawings, in which—

Figure 1 is a vertical longitudinal section of the apparatus, taken on the irregular section line 1—1 of Figure 2;

Figure 2 is a view in top plan of the apparatus;

Figure 3 is a detail vertical section substantially similar to Figure 1 showing the tiltable mounting for the printing material raised to a position of non-contacting engagement of said material with the negative.

Figure 4 is a section through the front portion of the housing, taken on line 4—4 of Figure 2 and showing in elevation one of the manually actuable controls for the dodging mechanism;

Figure 5 is a view taken substantially on the line 5—5 of Figure 4;

Figure 6 is a section taken substantially on the line 6—6 of Figure 2;

Figure 7 is a longitudinal section through a portion of the apparatus showing the means employed for automatically varying the distance between the point source of light and the effective point of exposure of the negative as the diameter of the pay-on roll for the negative increases;

Figure 8 is a section taken substantially on the line 8—8 of Figure 1;

Figure 9 is a section taken substantially on the line 9—9 of Figure 1;

Figures 10 to 13, inclusive, are respectively views of the blade arrangement of the dodging mechanism showing the blades in various positions of angular and parallel adjustment according to the precise configuration of any section of the negative, the density of which necessitates controlling the light for proper photographic exposure of said section;

Figure 14 is a section taken substantially on line 14—14 of Figure 1;

Figure 15 is a section taken substantially on line 15—15 of Figure 1;

Figure 16 is a view partly in elevation and partly in section of the light intercepting grid;

Figure 17 is a view in end elevation thereof;

Figure 18 is a section taken on line 18—18 of Figure 16;

Figure 19 is an enlarged longitudinal sectional view through the mounting for the magazine roll for the negative;

Figure 20 is a transverse section through the clutch taken substantially on the line 20—20 of Figure 19;

Figure 21 is a transverse section taken substantially on the line 21—21 of Figure 19;

Figure 22 is a longitudinal section through a portion of the driven means and mounting for the pay-on roll for the negative, showing the roll latched to the driven sprocket of the transmission mechanism;

Figure 23 is a view substantially like Figure 22, showing the pay-on roll for the negative unlatched;

Figure 24 is a transverse section, taken on the line 24—24 of Figure 22;

Figure 25 is a section taken on line 25—25 of Figure 22, and

Figure 26 is a section through a portion of the stationary cam of the mounting for said pay-on roll.

In the preferred embodiment of the invention herein illustrated, use is made of reeling and unreeling mechanism which includes a pair of combined pay-on and pay-off rolls, such that a coiled strip of negative film can first be unreeled from one of the rolls and reeled onto the other during the printing operation and the procedure afterwards reversed at will, whereby successive runs of the same negative can be effected without having to remove the rolls from the apparatus. During translation of the negative, a continuous strip of photographic printing material is fed in absolute synchronism therewith while maintaining constant intimacy of contact between the emulsion side of the negative and the sensitized side of the printing material. To the end that there shall be no relative motion either laterally or linearly between the surface of the negative and the printing material during translation thereof, means are provided to prevent over running of the negative during unreeling thereof from its magazine roll and for concurrently positively driving the roll onto which the negative is being reeled. To insure absolute synchronism of motion of the negative and the printing material, a rectilinear stretch of the negative passes over spaced apart idler rolls, the latter coacting with a large diameter idle pressure roll which is common to relatively independent reeling and unreeling mechanisms. The forms, relationship and construction of the various elements of this mechanism insure the formation in the negative of a friction inducing wrap which extends preferably not less than 180° about the aforementioned large diameter pressure roll. By reason of constant tension upon the negative intimacy of surface contact is established and always maintained between the negative and the printing material. In order further to insure absolute synchronism of motion of the negative and the printing material, means are embodied in the respective reeling and unreeling mechanisms for preventing any possible over running of the rolls of these mechanisms and to maintain a constant tension or frictional drag upon the printing material which is exactly equal to the tension maintained upon the negative during the printing operation.

Persons trained in the art are cognizant of the fact that in photography, the term "exposure" means—the length of time light or luminous flux is allowed to act upon a sensitized surface, and that this is made up of two factors, namely, (1) light strength, and (2) the length of time the light acts upon said sensitized surface. Stated differently, it is recognized that illumination falls off quite rapidly with increased distance from the light source, the numerical relation being stated in the inverse square rule, which is, that—illumination varies inversely as the square of the distance from a point source of light. In the instant embodiment of the invention now about to be described in more complete detail, the angular velocity of an idle roll necessarily varies according as the diameter of the pay-on roll of negative increases during the printing operation. Should one attempt to print under these conditions, the source of illumination remaining always a fixed distance from the effective point of contact of the negative with the printing material, improper exposure would result. To overcome this and accurately to compensate for any change of speed of the idler roll, use is made of a point source of light, the relative distance between which and said idler roll varies in exact proportion to changes in the diameter of the pay-on roll and the angular velocity of the pressure roll. Thus, as the diameter of the coil of negative increases and the speed of the pressure roll likewise increases, the distance between the idler roll and said light source decreases, as it must, if proper exposure is to be assured.

In addition to preventing either over or under exposure of the printing material at any instant in the printing operation, provision is also made for controlling illumination in accordance with whatever is the density of any part of the continuous negative.

Referring now to the various drawings forming a part of this specification, the various departments or mechanisms of the apparatus and the modus-operandi of each thereof and coaction of said mechanisms and the elements will be understood upon reference to the following descriptions:

General outline

While it is to be understood that there is an absence of any intention to confine the invention to any particular form of mounting for the various coordinated mechanisms, it is found convenient to employ a housing 1 of suitable construction, the same containing a motor 2 as a part of a power transmission; a point source of light 3; means 4 for automatically varying the distance between said point source of light and the effective exposure point P of the apparatus; and a dodging mechanism 5. Exteriorly of the housing and situated above same are the respective mechanisms for reeling and unreeling the negative and the printing materials.

Negative reeling and unreeling mechanism

The negative reeling and unreeling mechanism comprises a roll 6 having end flanges 7 and 8, the former having a bearing opening 9 and the latter provided with slots or key-ways 10 which are coaxial relative to the aforementioned bearing opening 9, as shown at Figure 19 of the accompanying drawings.

Fixedly supported from one side of the frame 11 of the motor housing is a bearing sleeve 12 having a cylindrical bore 13. Said bore opens upon the respective ends of said sleeve and within the bore and adjacent to the outer end thereof is a ball bearing 14, through the inner ball race 15 of which passes an axially slidable and manually rotatable plunger 20. To the outer end of said plunger is keyed at 18, a knurled controlling knob 19. The opposite end of said plunger is formed with an enlarged cylindrical portion 21. The outer end of said portion 21 is formed with a coaxial, cylindrical stub shaft 22 which is freely receivable in the bearing opening 9 in the head 7 of roll 6. At the inner end of said portion 21 and formed as an integral part thereof is a circular disk 23 in the periphery of which is a slot 24.

Interposed between the bearing 14 and the disk 23 is a coil spring 25, the office of which is to urge the plunger axially in a direction normally to effect retention of the stub shaft 22 in the opening 9 of said spool head 7. Projecting into the bore 13 and adjustable upon the sleeve 12 is a stop screw 26 for latching the plunger in a retracted position. This is accomplished by grasping the knob 19 and pulling the plunger against the urging tendency of spring 25, then turning the plunger to cause registration of the pin 26 with the slot 24 in disc 23. The plunger can then be manipulated so as to cause the pin to pass through said slot and to latch the plunger in a retracted position, the reason therefor being to enable removal of the spool 7 as and wherever this is desired.

At the opposite side of the frame 11 is a bearing sleeve 27 and journaled in bushings 28 therein is a shaft 29 having a crank handle 30 at its outer end and a cylindrical enlarged portion 31 at its inner end, the latter formed with fins or keys 32 adapted to be received in the slots or key-ways 10 in the head 8 of aforementioned roll 6. Keyed at 33 to shaft 29 is the cam 34 of a clutch mechanism 35. Said cam is received in a cylindrical drum 36 and, as shown, said drum is partly embraced by the friction shoes 37 of a split metallic band 38 which may be contracted by the screw 39 so as to vary the friction between the shoes 37 and the smooth peripheral face of drum 36. During unreeling or counter-clockwise rotation of the roll 6, the friction bodies 40 in the latching and releasing recesses 41 of the cam become wedged between the camming surfaces 42 of said recesses and the inner smooth face of drum 35, thereby frictionally retarding rotation of the roll 7 in a manner to prevent over-running thereof and to create, so to speak, a relatively constant, uniform tension upon the negative N as will be appreciated upon reference to Figure 1. This will be further fully understood upon reference to the following description of the structural and functional characterizing features of the pay-on roll 43.

When the direction of rotation of the roll 6 is reversed, that is to say, the spool is rotated clockwise, the clutch bodies 40 move into the spaces 44 in the cam, thereby enabling manual reeling of the negative from drum 43 to drum 6. In this manner, the roll 6 can either be readily removed and a similar roll with a new negative substituted therefor, or, the same negative may again be run through the printer if duplicate prints of the same negative are desired to be made. Separate negatives of different panoramic photographs can be spliced together and prints obtained in a single operation, depending only upon the capacity of the apparatus.

From roll 6, the negative N passes over idler rolls 44A and 45—45, the distance between the extreme lefthand roll 45 (Figure 1), and roll 44A being such as to form in the negative a stretch S disposed flatwise above a glass viewing or display panel 46 at the top of a lamp house 47, the latter containing an electric lamp 48 for illuminating the negative as it moves across the panel, thus enabling the operator readily to ascertain the density of the negative at all times during the printing operation. Photographic pictures upon the negative will frequently be made at different times of the day and under varying light conditions, hence, it is necessary when making prints from the negative that the illumination during the printing operation be controlled accordingly.

The distance between the rolls 45—45 is precalculated so that when the negative is threaded through the printer initially, a linear stretch S1 is formed in the negative, which afterwards will be converted into a friction wrap, the purpose of which will be fully understood as the description proceeds. The front end of the negative is then detachably secured to roll 43 in any well known manner, such, with adhesive tape, not shown.

Roll 43 is formed at one end with a head 49 having a spring pressed latching stud 50 adapted to engage in any one of a circular series of openings 51 in a sprocket wheel 52 carried by sleeve 53, the latter mounted upon an axially slidable bushing 54 through which the shaft 55 of roll 43 passes, there being a coil spring 55a around the shaft and between one end of the bushing and one end of the roll for urging the bushing axially to the position shown at Figure 23 when it is desired to free the roll for counterclockwise rotation when reeling the negative back onto roll 6 at the conclusion of the printing operation.

Mounted also upon the sleeve 53 is a sprocket wheel 56 having a friction face 57 at one side. Tiltably supported on the frame 11 is a mounting member 58 having depending bearing brackets 59 in which the reduced ends 60 of shaft 55 are received, one of said ends being attached by means of a fastening 61 to a stationary cam 62 which is fixed at 63 to one side of the frame 11 as shown at Figures 22 and 23. The bracket 59 at the end of the shaft 55 adjacent to the sprocket wheel 57 has slidable pins 64, the inner ends of which are formed with friction elements 65 which have running engagement with the friction face 57 of said wheel 56. The opposite or outer ends of said pins are engaged with the low places 66 of said cam 62 when the mounting member 58 is raised as shown at Figures 3 and 23, whereby and due to the urging tendency of the aforementioned spring 55a, the bushing, together with both wheels 52 and 56 will be moved to the position shown at Figure 23, thus freeing roll 43 for rotation in an unreeling direction. When the mounting member 58 is lowered to the position indicated at Figures 1 and 22, the studs 64 ride onto the high places 67 of the cam 62, thereby latching the roll 43 to sprocket wheel 52, thus insuring rotation of the roll when the bushing 54 is driven. By interposing friction between the roll 43 and sprocket 56, resistance is offered the roll so that tension is constantly maintained upon the negative during the printing operation.

*Printing material reeling and unreeling mechanism*

The reeling and unreeling mechanism for the printing material M comprises the aforementioned tiltably supported mounting member 58 which is adapted to be tilted from the horizontal position shown at Figure 1 to the upwardly inclined position shown at Figure 3. When in a horizontal position, said mounting member has its resilient latch members 68 engaged with keepers 69 upon the frame 11 as clearly shown at Figure 1.

Said member 58 has an unreeling roll 70 and a reeling roll 71 mounted thereon. As these rolls and their mechanical adjuncts are substantially the same, if not identical to like parts in the description of roll 6 and its mechanical adjuncts, it is believed that a description of the former as the functional amply suffice for the former as the functional features and accomplishments of all of the rolls are the same, i. e., to insure production and maintenance of friction of sufficient force to prevent unwanted freedom of rotation of said rolls and to insure linear tension on the material being handled.

Supported for rotation beneath the member 58 is a large diameter idler or pressure roll 72 the diameter of which is calculated freely to allow the roll to be lowered to the position, Figure 1, when the member 58 is lowered. Said roll 72 constitutes the focal point referred to in the hereto appended claims. This is evidenced both from the disclosure, Figure 1 of the drawings, and from the position of raised adjustment, Figure 3. It is also noted that the printing material M is trained under the roll 72 in a manner to bring its sensitized surface in contact with the emulsion side of the negative. The printing material is then led upward and over the roll to which latter, the front end of the material is removably attached.

It follows from the foregoing description that due to the friction induced at the points of rotational motion of all rolls of the respective mechanisms, the printing material is brought into intimate contact with the emulsion side of the negative and that each, the said negative and the printing material is wrapped about the roll 72 approximately 180°, thus, further to prevent any possibility of relative motion between the negative and said printing material.

It will suffice to say that as the rolls 70 and 71 are in all essential respects like the roll assembly for roll 6, said rolls are each thereof freely removable, thereby enabling new rolls to be substituted for any that have been removed from the apparatus.

The transmission mechanism

The transmission mechanism comprises the motor 2, a power transferring belt 73 which is trained over a driven pulley 74, a gear pinion 75 in mesh with a driven gear 76, a chain drive 77 between a gear 76A and gear 52 of the negative reeling and unreeling mechanism and a chain drive 78 between sprocket 56 and the roll 71, the latter forming part of the reeling and unreeling mechanism for the printing material.

The point source of light

Referring particularly to Figure 7 of the drawings, it is noted that an electric lamp 79 is contained within a lamp house 80 which constitutes part of a vertically tiltable carriage 81, pivoted at 82 to the frame 11 forwardly of the negative reeling and unreeling roll 43. At 83 is a rocker arm, pivoted at 84 and provided with a short lower extension 85 and a somewhat longer extension 86, the latter having a follower roller 87. The longer extension 86 projects through a slot 88 in an arcuate trough-like section of the housing of the apparatus to afford free motion of the rocker arm in response to constantly changing positions of the roller 87 relative to the periphery of roll 43, it being understood that said roller is always in free rolling engagement with the outermost wound portion of the negative. The short extension 85 of said rocker arm is connected to the free end of the carriage 81 by a pivoted link 89. To this point, it manifestly follows that as the diameter of the coil of negative film increases, motion is imparted to said rocker arm, which motion, in turn, is transferred to said carriage with the result that the distance between the point source of light and the effective point of light exposure varies as a function of time or correctly in accordance with variations in speed of the pressure roll 72 as the diameter of the coil of negative film increases on said roll 43. The lamp house 80 has an aperture 90 which opens towards P, the effective exposure point and is adapted to be covered to any desired extent by a flat-blade shutter 91. A retractile spring 92 has one of its ends attached to said shutter and its opposite end secured to the free end of a fixed rod 92a carried by the lamp house 80. Thus, the spring tends normally to exert an opening influence upon said shutter.

In order that the amount of light emitted from the lamp house can be controlled by the operator at any instant, a tiltable finger 93 is secured to a shaft 94 having a pinion 95 which meshes with a worm gear 96 upon a shaft 97. The shaft 97 is journaled in bearing brackets 98 carried by the lamp housing, and, as shown, one end of said shaft has a ball 99 and pin 100 telescopically connected with a tubular control member 101. The front end of said member is similarly connected with a manually actuable knob 102 at the front end of the printer, the said knob coacting with a graduated dial 103 by means of which the condition at the aperture can be accurately determined. The pin 104 of the ball joint connection at the front end of the member 101 connects with one end of a coil retractile spring 105, the opposite end of which is connected to said member 101 at 106.

Any desired adjustment of the shutter 91 can be made quickly and accurately by simply manipulating the control knob 102.

The negative N is generally of considerable width and for satisfactory results, the lamp should be of the long tubular type which is substantially co-extensive with the width of the negative and the length of the light aperture 90.

The dodging mechanism

In coaction with the means aforementioned for visually disclosing the density of the negative film strip N, is a dodging mechanism which consists of a light emitting structure interposed between the effective exposure point P and the lamp house 80. Said structure embodies a plate 107, apertured at 108, the aperture being coincident with and substantially of the same length as said aperture 90. The plate 107 has a flange 109 and attached thereto in a plane intercepting the light beam from the lamp house 80 is a light diffuser 110, the same comprising a hollow metallic structure open at two sides and towards the respective apertures 90 and 108 and having spaced apart walls 110a—110a connected together by spaced apart diagonal metallic grid elements 111.

Situated at the under side of the plate 107 is a pair of light dodging blades 110b—110b operating flat-wise across the light aperture 108. The inner ends of said blades overlap each other, one of said blades being slightly offset from the other so that the faces of the blades, which are in opposing relation to the aperture, are disposed in the same general plane. The outer ends of said blades are received in fixed guide-ways 112 upon the plate 107. The meeting ends of these blades are provided with aligned, elongated slots 113 into which extend the free end of a tiltable finger 114. Adjacent to the outer end of each individual blade is an elongated slot 115 and extending into each said slot is a tiltable finger 116. Coil retractile springs 117 tend to urge the blades to the position of absolute alignment shown at Figure 13.

The finger 114 at the central joint of the blades 110b—110b and the end of each individual blade has pivotal connection with a respective system of links 118 and, as illustrated, each said system has operative connection at 119 with an oscillatory control element 120 at the front of the printer. Each individual control element functions in coaction with graduations 120a on the housing of the printer, whereby the extent of adjustment of any selected blade can be accurately determined. Each said control element includes a circular surface 121 which has yielding engagement with an adjustment retaining spring 122.

By reason of the fact that the controls for said blades are individually actuable, the aperture 108 can be controlled so as to admit more or less light to any portion of the negative as, within the discretion of the operator is deemed necessary upon constant attention being directed by him to the density of any part of the negative as is made visually discernible at the display panel 46. The blades are capable of instantaneous adjustment and mutually coact to convert the rectilinear aperture 108 whose longitudinal walls are parallel to each other, into an aperture of most any desired geometrical configuration, as will be appreciated upon reference to Figures 9 to 13, inclusive of the drawings.

With the two reeling and unreeling mechanisms in the positions shown at Figure 1, and assuming that motion is being transferred to pay-on roll 43 of the negative reeling and unreeling mechanism and to the pay-on roll 71 of the reeling and unreeling mechanism for the photographic printing material, then, under these conditions, the printing material will be moving in absolute synchronism with the negative and both thereof will be continuously wound on their respective pay-on rolls. At this point, it shall be borne in mind that when the two mechanisms are in the relative positions just mentioned, roll 43 is positively latched to sprocket wheel 52 by the resilient lug 50 by reason of its coaction with an opening 50 in said sprocket wheel. The islands or high places 66 of cam 62 effect and maintain frictional engagement of clutch elements 65 with the friction face of wheel 56, at which time, the hub 54 is forced in a direction to compress spring 55a. As a result of the forms, construction and arrangement of these several elements, positive rotational motion in a counter-clockwise direction is transferred to roll 43. In like manner, motion in a clockwise direction is transferred to pay-on roll 71. It is proper that it be made clear that both wheels 52 and 56 are fixed to the hub 54 and that the primary office of the cam 62, friction elements 65 and the friction face 57 of wheel 56 is to transmit sliding motion to the hub and said wheels 52 and 56, whereby the latching lug 50 will be either operatively retrieved from a coengaging opening 51 in wheel 52 or projected thereinto depending upon the position of adjustment of the reeling and unreeling mechanism for the sensitized printing material M.

In Figure 3, wherein the reeling and unreeling mechanism for the photographic printing material is tilted to an inactive position relative to the underlying mechanism for the continuous strip of negative film, it is noted that the bracket 59 which turns about the axis of shaft 55 causes friction elements 65 to ride onto the low places 66 of cam 62, whereupon, and by reason of the office of spring 55a, the hub 54 and the sprocket wheels carried thereby are moved axially as a unit to the position shown at Figure 23, thereby freeing or retrieving said latching element 50 from its latched engagement with said wheel 52. With the elements in these positions, roll 43 is now free for rotation in a counter-clockwise direction and the negative can now be rewound upon roll 6 preparatory to making another print from the same negative. In this manner, successive runs of the same negative can be quickly made with utmost ease and facility.

We emphasize the feature of the invention which consists in the combination of separate mechanisms for respectively handling the negative and said photographic printing material, one of which is adjustable relative to the other and adapted when in one possible position of adjustment to insure transmission of positive motion of the negative and its associated printing material, and in a manner to secure absolute synchronism of translation thereof. When the two mechanisms are in the relative positions of adjustment shown at Figure 3, the roll 71 together with its sensitized printing material can be removed and a similar, but empty roll substituted therefor, or and instead, should it be found desirable, the wound material on roll 71 can be rewound on roll 70, the former operation being preferred because of the speed with which printing can be carried on aided by convenient substitution of the rolls employed and introduction of a fresh supply of printing material as the occasion demands. This is true, also, of roll 6 which can be easily removed from the printer and another one, loaded or containing another negative substituted therefor. In a printer of the character herein disclosed, time is of the essence of the apparatus as frequently the negative is both quite wide and of considerable length, hence, our stressing particularly certain of the structural and functional features of the invention which enable the negative to be handled with utmost despatch.

Particular stress is also placed upon the purpose of the clutch mechanism for roll 6, the same functioning in a highly reliable manner to insure positive rotation of said roll with its shaft 29 when rewinding the negative upon said roll and, at the same time, to impose a frictional drag upon the negative and thereby prevent overrunning of the negative when winding same onto roll 43 in the printing operation. By frictionally resisting linear motion of the negative and by bringing idler roll 72 to bear against the plain side of the photographic printing material so as to form both in the negative and in the printing material, a wrap extending preferably 180° about said roll, pressure is placed upon these materials. This pressure, plus the friction placed upon the negative by the action of the aforementioned friction elements or shoes 37 insure absolute synchronism of translation of said materials, and eliminates any tendency of the materials to slip relatively in either an axial or a linear direction. Furthermore, the pressure induced upon said materials at said roll maintains that intimate or uniform flat contact of the emulsion side of the negative with the sensitized side of the printing material, which, obviously, is required for the making of clear, well defined prints.

While only a preferred embodiment of the printer has been disclosed and described, it will be understood that changes in the form, arrangements, proportions, sizes and details thereof may be made, without departing from the scope of the invention as defined by the hereto appended claims.

To the best of our knowledge, it is new in the art to provide coordinated reeling and unreeling mechanisms operating in absolute synchronism while maintaining uniform pressure of the emulsion side of the negative with the sensitized side of the printing material at the exposure aperture, the said mechanisms further coacting with a light source and associated means so as accurately and automatically to render illumination at said aperture always proportional to any change in the linear velocity of said negative and the printing material throughout the entire printing operation.

While we disclaim broadly the combination which merely consists of a light source in printing coaction with continuously moving photographic strip materials, we claim these elements in an environment never before used, namely, association of said light source with "dodging" mechanism which is manually actuable to govern at will and according to the density of any part of the negative the amount of illumination at said exposure aperture at any stage and without interrupting the printing operation.

What we claim as our invention is:

1. In a photographic printer, a source of printing light; means providing a focal point in front of said source of light; means for imparting continuous translatory motion at a progressively increasing velocity to a photographic negative and a strip of light sensitive material while maintaining the negative in printing contact with said material at said focal point; means supporting said source of light for movement relative to said focal point, said motion imparting means including a driven pay-on roll on which the negative is continuously wound; and means responsive to continuous changes in the diameter and peripheral speed of said roll for continuously moving said light source in a direction to equalize the intensity of printing illumination at said focal point throughout the printing operation, said last named means comprising a follower connected with said source of printing light and disposed for continuous actuation by the film and in synchronism with progressive increase in diameter of the roll during the printing operation.

2. A photographic printer comprising a base structure provided with a pay-off roll for a photographic negative, a pay-on roll for said photographic negative, and a source of light interposed between said pay-off and pay-on rolls; a super structure having a pay-off roll for a strip of photographic printing material, a pay-on roll for said material and a focal roll under which said printing material is adapted to be trained, means for resisting free rotational motion of the first and second named pay-off and pay-on rolls; said super structure mounted on said base structure for vertical tilting adjustment and said focal roll being disposed so that when said super structure is tilted from one possible position to another said focal roll will be correlated to said light source and the roll forced into intimate printing contact with the negative, and means for securing the super structure against tilting motion when adjusted to said other position.

3. A photographic printer comprising a base structure provided with a pay-off roll for a photographic negative, a pay-on roll for said photographic negative, a source of light interposed between said pay-off and pay-on rolls; a super structure having a pay-off roll for a strip of photographic printing material, a pay-on roll for said material and a focal roll under which said printing material is adapted to be trained, means for supporting said source of light for movement relative to said focal roll and said super structure mounted on said base structure for vertical tilting adjustment so that when in one possible position of adjustment said roll will be correlated to said light source and the roll forced into intimate printing contact with the negative; means actuable continuously as the photographic negative is being wound onto its pay-on roll for moving the light source relative to said focal roll, and means for securing said superstructure against vertical tilting motion during the printing operation.

4. A photographic printer comprising a base structure having a pay-off roll for a photographic negative and a pay-on roll for said negative, and a source of light situated between said rolls; a super structure mounted for vertical tilting adjustment on said base structure and having a pay-off roll for a strip of photographic printing material and a pay-on roll for said material and a focal roll, the latter mounted and disposed so that said printing material is adapted to be trained thereunder and have free running engagement therewith and whereby upon adjustment of said super structure from one possible position to another, said roll will flex the photographic material and dispose same in the path of light emitted from said source of light and in flat contact with and in printing relation to said negative continuously during the process of winding said material and said negative onto their respective pay-on rolls; means including a source of light for continuously illuminating the negative at a point between the pay-off roll for said negative and the aforementioned focal roll, thereby rendering the densities of the negative discernible, and a dodging mechanism in coaction with said first named source of light and including a structure having a rectilinear light aperture which is substantially co-extensive with the width of said negative, a pair of flexibly connected blades of light excluding material mounted in coactive relation to said aperture for controlling emission of light from said first named source of light, and means for actuating said blades to control emission of light from said first named source of light in accordance with the densities of any portions of the negative.

5. In a continuous photographic printer employing a focal roll with which a strip of photographic negative and a strip of photographic printing material are adapted to have free running engagement while the negative is in constant printing relation to said printing material, a point source of light including respective means each having a rectilinear light aperture which is parallel to and substantially coextensive with said focal roll, said respective means having their apertures in alignment along a line extending radially of said focal roll, a shutter adjustable at will across the aperture of one of said means, and selectively actuable mechanism coacting with the aperture of the other said means for controlling the amount of light emitted from any portion of the aperture of said means in accordance with the density of any portion of the negative.

6. A continuous photographic printer comprising a movably supported light source; mechanism for the continuous-synchronous translation of a photographic negative film and a strip of photographic printing material through the printer and across said light source and for pressing said film and said material in printing contact with each other where they cross said light source, said mechanism including a driven roll on which the film is adapted to be continuously wound; film-operated means flexibly coupled to said light source and comprising an actuating member related to said roll so as to be continuously urged in one direction by the film as the latter is being wound so that in synchronism with increase in the diameter of the roll and resulting increase in the peripheral speed thereof the light source is in continuous motion in a direction and at a rate insuring printing illumination which is proportional to the velocity of the film and said material throughout the printing operation.

7. A continuous photographic printer comprising a movably supported light source; an idler roll in front of said light source; means for the synchronous translation of a photographic negative film and a strip of photographic printing material through the printer and under said idler roll for exposing same to said light source and while maintaining said film in printing contact with said printing material; and means in coaction with said driven roll and connected to said light source for continuously moving the latter in the direction of said idler roll and at a rate which varies with gradual increase in the diameter of the driven roll and increase in the peripheral speed thereof and including a motion transmitting member constantly contacting the periphery of said driven roll and continuously urged in a direction to move said light source as aforestated and thereby secure printing illumination which is proportional to the velocity of the film and said printing material across said light source at any instant during the printing operation.

8. A continuous photographic printer comprising a pay-on roll upon which a strip of negative film is adapted to be wound; means having an exposure aperture across which said film is adapted to move while being wound on said roll; a light source mounted for movement relative to said aperture; means connected with said light source and continuously coacting with the film at and as it is wound on said roll to move said light source in synchronism with a constantly increasing diameter of the roll and resultant increase in the peripheral speed thereof to thereby vary illumination at said aperture in accordance with changes in the velocity of the film at any instant across said exposure aperture; and means for feeding a strip of photographic printing material through the printer in synchronism with the film and while maintaining same in printing contact therewith.

9. A continuous photographic printer comprising a movably supported light source; means having an exposure aperture in coaction with said light source and across which a photographic negative film is adapted to move; a dodging mechanism embodied in said means; means for selectively controlling said dodging mechanism to render light at said exposure aperture proportional to the density of any part of the film; and means continuously actuable by and during translation of the film for varying the distance between said source and said exposure aperture and comprising a driven pay-on roll for the film and means connected with said light source and actuable by the film at and as it is wound on the roll for moving said light source towards said aperture at a rate which varies in accordance with progressive increase in diameter of the roll during continuous translation of the film.

10. A continuous photographic printer comprising a movably supported light source; means having an exposure aperture in coaction with said light source and across which a photographic negative film is adapted to move; a dodging mechanism embodied in said means; means for selectively controlling said dodging mechanism to render light at said exposure aperture proportional to the density of any part of the film; and means continuously actuable by and during translation of the film for varying the distance between said source and said exposure aperture and comprising a driven pay-on roll for the film; and means actuable by the film for moving said light source towards said aperture at a rate which varies in accordance with progressive increase in diameter of the roll during continuous translation of the film, said last named means comprising a rocker arm connected with said light source and disposed relative to said pay-on roll for actuation thereof by the film at and as it is being wound on said roll.

11. A photographic printer comprising a point source of light providing printing illumination; means having a rectangular light aperture in front of said point source of light; means providing a focal point which is coextensive with the light aperture and disposed parallel to and in front thereof and across which a strip of negative film and a strip of photographic printing material are adapted to be moved in synchronism while in printing contact with each other; means for moving said film and said printing material in the manner aforementioned and for maintaining constant pressure against the strip and said material in the direction of said focal point to thereby establish and constantly maintain printing contact of the film with said material; a manually controlled dodging mechanism actuable as desired from exteriorly of said printer and comprising a plurality of light excluding shutters mounted and flexibly connected together for selective adjustment of one or all thereof to vary the size and shape of said aperture and enable exposure of portions of the film of known densities to greater or less illumination at said focal point; and means by which the density of any portion of the film is visually discernible from exteriorly of the printer before said film and the material approach said focal point, thereby enabling preadjustment of said shutters for the purpose aforementioned.

12. A photographic printer comprising a source of printing illumination; means having a rectangular light aperture in front of said source; means providing a focal point which is coextensive with the light aperture and disposed parallel to and in front thereof and across which a strip of negative film and a strip of photographic printing material are adapted to be moved in synchronism while in printing contact with each other; means for moving said film and said printing material in the manner aforementioned and for maintaining constant pressure against the strip and said material in the direction of said focal point to thereby establish and constantly maintain printing contact of the film with said material; a dodging mechanism actuable as desired from exteriorly of the printer and comprising a plurality of rectangular light excluding shutters flexibly connected together at their inner ends; means in which the outer ends of said shutters are slidably received; and means for adjusting said shutters to vary the size and shape of said aperture and comprising manually actuable controls respectively connected with said shutters to enable adjustment of one or all thereof in accordance with such size and shape of the aperture that is necessary for effective illumination in accordance with the density of any portion of the film; and means by which the density of any portion of the film is visually discernible from exteriorly of the printer in advance of the moment when the film and the material have approached said focal point.

FRED THEODORE SONNE.
VICTOR SUSSIN.